March 28, 1967 W. A. HARMENING 3,310,998
SCHEME FOR PRELOADING POWER GEAR TRAINS
Filed June 24, 1964
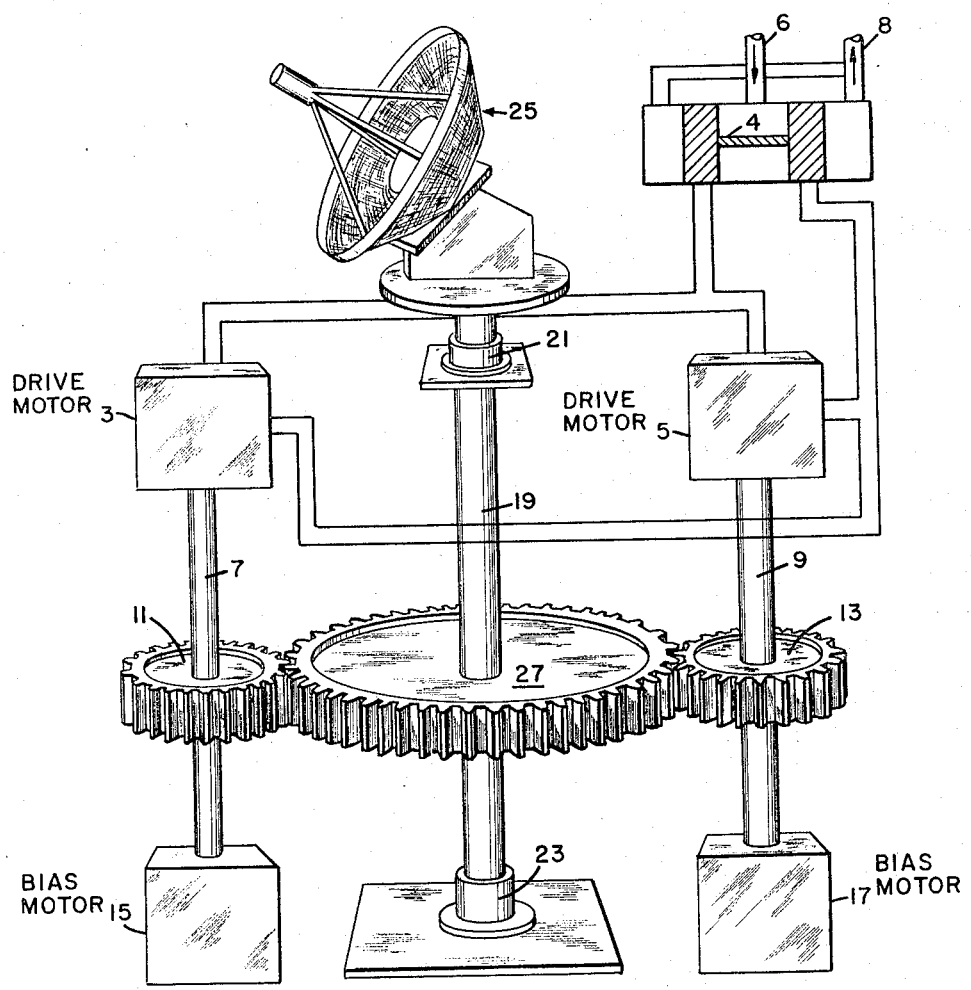
INVENTOR.
WAYNE A. HARMENING
BY
ATTORNEY 3,310,998
SCHEME FOR PRELOADING POWER GEAR
TRAINS
Wayne A. Harmening, Cherry Hill, N.J., assignor, by mesne assignments, to the United States of America as represented by the Secretary of the Navy
Filed June 24, 1964, Ser. No. 377,785
1 Claim. (Cl. 74—661)

The present invention relates in general to gearing and more particularly to a novel and improved gearing arrangement in which backlash is reduced to a minimum.

Various schemes have been employed in the past to reduce or eliminate backlash between gears in gear trains. Some prior commonly employed anti-backlash techniques employ spring loaded split gears which apply pressure on both sides of the teeth of mating gears. Such techniques, however, generally develop excessive friction and dynamic resistance to motion. Other prior anti-backlash techniques utilize compensation devices which are adjusted to reduce backlash and play between intermeshing gears. Even after proper adjustment of such devices, however, play between gears generally reappears particularly after a little use. Thus, although various techniques and devices have been devised in the past to eliminate backlash errors between meshing gears of a dynamic mechanical system, none heretofore have produced satisfactory results.

It is therefore a principal object of the present invention to provide novel and improved apparatus for transmitting rotational energy to a load through a gear train with minimum backlash and discontinuity in motion.

It is a further object of the invention to provide novel and improved anti-backlash apparatus which develops no excessive friction or resistance to motion.

It is a further object of the present invention to provide novel and improved anti-backlash apparatus in which no periodic adjustment of the spacing between meshing gears is necessary.

It is a further object of the present invention to provide novel and improved anti-backlash apparatus in which the driving gears of a gear train are preloaded or biased in opposite directions such that the leading edges of teeth of the driving gears are maintained at all times in full contact with the trailing edges of teeth of the driven gear.

Other objects and many of the attendant advantages of this invention will be readily appreciated as the same becomes better understood by reference to the following detailed description when considered in connection with the accompanying drawing wherein:

The single figure of the drawing is a diagrammatic view of a preferred embodiment of the present invention.

Referring now to the single figure of the drawing, it will be noted that a pair of hydraulic motors or any other suitable bi-directional sources of rotational energy 3 and 5 are preferably directly coupled to the drive shafts 7 and 9. Controlled, variable and/or reversible amounts of torque are respectively developed in motors 3 and 5 and applied to drive shafts 7 and 9 by any suitable conventional control mechanism such as the shuttle valve 4 which reverses direction of fluid to the motors 3 and 5 from the input hydraulic fluid line 6 and the return flow line 8. The control mechanism for each motor may take a great variety of different forms and for the sake of simplicity is not described or disclosed herein in detail. For a complete understanding of the invention, it need only be understood that torque in either direction is developed in motor 3 and applied to drive shaft 7 either manually or automatically by one control mechanism and torque in the same direction is developed in motor 5 and applied to drive shaft 9 either manually or automatically by the other or by the same control mechanism. In the drawing, each control mechanism will be considered a built-in feature of its associated motor.

Pinion gears 11 and 13 which are identical in design are preferably respectively secured to intermediate portions of drive shafts 7 and 9 as shown. Hydraulic motors or any other suitable sources of rotational energy 15 and 17 are respectively directly coupled to the lower ends of drive shafts 7 and 9. As will be more apparent hereinafter, motor 15 develops a predetermined constant amount of torque biasing drive shaft 7 and pinion gear 11 in the one direction. Motor 17 develops a predetermined constant amount of torque biasing drive shaft 9 and pinion gear 13 in the opposite direction. The torque developed on shaft 7 and pinion gear 11 by motor 15 is controlled such that it is equal and opposite the amount of torque developed on shaft 9 and pinion gear 13 by motor 17.

The output shaft 19, which is preferably oriented as shown substantially parallel and equidistant from the pair of shafts 7 and 9, is journaled in a suitable conventional plain bearing 21 and in the thrust bearing 23. The antenna or other load mechanism 25 which is to be angularly adjusted in azimuth or in elevation with precision is coupled to output shaft 19 in any suitable conventional manner. The main drive gear or the like 27 is secured to an intermediate portion of output shaft 19 and meshes with pinion gears 11 and 13 on shafts 7 and 9.

In operation, hydraulic motor or the like 15 at all times develops torque on drive shaft 7 and pinion gear 11 so as to urge the main drive gear 27 in one direction. Hydraulic motor or the like 17 simultaneously develops equal torque on drive shaft 9 and pinion gear 13 so as to urge the main drive gear 27 in the opposite direction. In the absence of output torque from motor 3 or motor 5, main drive gear 27 therefore remains stationary and in equilibrium. The leading edges of teeth on pinion gear 11, however, are constantly maintained in full contact with the teeth of main gear 27. Similarly, the leading edges of teeth on pinion gear 13 are maintained in full contact with the teeth of main gear 27 at all times. Inasmuch as the equal and opposed torques developed by motors 15 and 17 are preferably preset at values in substantial excess of the torques developed from time to time in either direction by motors 3 and 5, no lost motion or backlash occurs as rotational energy is transmitted to main gear 27 and load 25. Thus, for example, if 100 foot pounds of torque is developed on shaft 7 and pinion gear 11 in a clockwise direction and 100 foot pounds of torque is developed on shaft 9 and pinion gear 13 in a counterclockwise direction, no net torque is normally transmitted to main gear 27 and load 25. When 10 foot pounds of clockwise torque is applied through a common control mechanism to both motors 3 and 5, a clockwise torque of 110 foot pounds is applied through shaft 7 and pinion gear 11 to main gear 27, and a counterclockwise torque of 90 foot pounds is applied through shaft 9 and pinion gear 13 to the main gear 27. A net clockwise torque of 20 foot pounds is therefore transmitted to main gear 27 and load 25. A net counterclockwise torque is developed on main gear 27 and load 25 in a similar manner when an input counterclockwise torque is applied to motors 3 and 5 through a common control mechanism.

It will be noted that, even though torque is developed in motors 3 and 5 in either direction, pinion gear 11 always tends to rotate main gear 27 in one direction and pinion gear 13 always tends to rotate main gear 27 in the opposite direction. The constant full contact between the leading edges of pinion gears 11 and 13 and main gear 27 therefore eliminates lost motion or discontinuity in motion in the driving gear train. The antenna or other load mechanism 25 which is to be accurately angularly adjusted therefore follows rotational movements of drive shafts 7 and 9 in either direction without error due to play between the driving gears.

Obviously, many modifications and variations of the present invention are possible in the light of the above teachings. It is therefore to be understood that within the scope of the appended claim, the invention may be practiced otherwise than as specifically described.

What is claimed is:

Apparatus for applying torque to a load in either direction with minimum backlash, said apparatus comprising:

(a) a pair of drive shafts oriented in a predetermined spaced parallel relationship;
(b) a first hydraulic motor which controls the application of torque to one drive shaft in either direction;
(c) a second hydraulic motor which controls the application of torque to the other drive shaft in either direction;
(d) a pinion gear mounted on each drive shaft;
(e) an output shaft oriented substantially parallel and equidistant from the pair of drive shafts;
(f) means for coupling the output shaft to the load;
(g) a third hydraulic motor which applies a constant torque on the one drive shaft in one direction;
(h) and a fourth hydraulic motor which applies a constant torque on the other drive shaft in the opposite direction, the constant torque developed by the fourth hydraulic motor being equal and opposite to the torque developed by the third hydraulic motor.

References Cited by the Examiner

UNITED STATES PATENTS

| | | | |
|---|---|---|---|
| 2,737,056 | 3/1956 | Baumgartner | 74—409 |
| 2,902,875 | 9/1959 | Finally et al. | 74—409 |
| 3,110,195 | 11/1963 | Hanley | 74—409 X |
| 3,166,952 | 1/1965 | Lang | 74—665 |
| 3,174,351 | 3/1965 | Spencer | 74—409 |
| 3,180,156 | 4/1965 | Harris | 74—665 |
| 3,238,730 | 3/1966 | Webb | 74—665 |

OTHER REFERENCES

Contemporary Design, Machine Design, May 1953, page 140.

DAVID J. WILLIAMOWSKY, *Primary Examiner.*

J. R. BENEFIEL, *Assistant Examiner.*